United States Patent [19]
Fulford et al.

[11] Patent Number: 5,015,447
[45] Date of Patent: May 14, 1991

[54] RECOVERY OF RARE EARTH ELEMENTS FROM SULPHUROUS ACID SOLUTION BY SOLVENT EXTRACTION

[75] Inventors: George D. Fulford; Gordon Lever; Taichi Sato, all of Kingston, Canada

[73] Assignee: Alcan International Limited, Montreal, Canada

[21] Appl. No.: 381,577

[22] Filed: Jul. 18, 1989

[51] Int. Cl.$^5$ .............................................. C01F 17/00
[52] U.S. Cl. ........................... 423/21.5; 423/DIG. 14
[58] Field of Search ............... 423/21.1, 21.5, DIG. 14

[56] References Cited

U.S. PATENT DOCUMENTS 4,041,125  8/1977  Alstad et al. ..................... 423/21.1
4,808,384  2/1989  Vanderpool et al. ............. 423/21.1

FOREIGN PATENT DOCUMENTS 1291416  12/1986  Japan ............................. 423/21.1
1444301  12/1988  U.S.S.R. ........................ 423/21.1

Primary Examiner—Melvin J. Andrews
Attorney, Agent, or Firm—Cooper & Dunham

[57] ABSTRACT

A process is described for the recovery of rare earth elements from a sulphurous acid solution containing them. The rare earth elements can be successfully separated and recovered by solvent extraction from the sulphurous acid solution, being an organo-phosphorus compound as extraction agent. Di-2-ethylhexyl phosphoric acid or 2-ethylhexyl phosphonic acid mono-ethylhexyl ester is preferred as extraction agent.

25 Claims, 2 Drawing Sheets

RECOVERY OF RARE EARTH ELEMENTS FROM SULPHUROUS ACID SOLUTION BY SOLVENT EXTRACTION

This invention relates to a process for recovering rare earth elements from acidic aqueous media and, more particularly, from sulphurous acid leach solutions.

The Bayer process for producing alumina comprises, as its first step, leaching or digesting bauxite or similar crude ores with a solution of sodium hydroxide to extract alumina minerals contained therein as a solution of sodium aluminate. At the same time, as much as one third to one half of the total weight of the crude ore used is discharged as a residual red mud. This red mud typically contains substantial amounts of silica, alumina, iron oxide, titania and sodium compounds. Many red muds also contain small but valuable quantities of rare earth elements, and in some cases include significant quantities of scandium and yttrium.

Various processes have been described for recovering valuable components from red mud and one such process is described in U.S. Pat. No. 3,311,449, issued Mar. 28, 1967. It utilizes a process comprising the steps of absorbing gaseous sulphur dioxide by a slurry including red mud of a suitable concentration to separate and recover the sodium component; adding water to the resulting residue to form an aqueous suspension; reacting gaseous sulphur dioxide on the aqueous suspension to dissolve alumina and silica, separating the solution from the insoluble material which includes iron oxide and titanium dioxide; heating the resulting solution to drive off some of the gaseous sulphur dioxide which is supplied to the preceding steps and to deposit silica for the purpose of removing same; further heating the remaining solution to drive off some of the gaseous sulphur dioxide which is also supplied to the preceding steps and to deposit and separate basic aluminum bisulfite which, in turn, is calcined into alumina. However, the above process does not consider the possibility of being able to separate rare earth elements from the red mud.

Another process for separating useful compounds from red mud is described in U.S. Pat. No. 3,574,537, issued Apr. 13, 1971. In this procedure, the red mud is once again digested with sulphur dioxide in the presence of water to selectively dissolve such components as alumina, silica and the sodium component, while leaving iron oxide and titanium dioxide essentially undissolved. The dissolved components were then separated by precipitation from the solution. Again, no mention was made of the possibility of separating rare earth elements from the red mud.

Fulford et al, Canadian Application Serial No. 595,496 filed Apr. 3, 1989 entitled "Recovery of Rare Earth Elements from Bayer Process Red Mud" describes a process for the recovery of rare earths from Bayer process red mud in which the red mud is digested in a dilute digestion acid comprising sulphur dioxide dissolved in water to obtain a final digestion slurry having a pH of about 1.8 to 3 whereby rare earths are selectively dissolved while leaving iron and titania in the red mud substantially undissolved. The obtained acidic solution containing rare earths is separated from the remaining insoluble components and the rare earths are then recovered from the acidic solution.

U.S. Pat. No. 3,378,352, issued Apr. 16, 1968, describes a solvent extraction process for the recovery and separation of thorium and rare earth values from acidic aqueous solutions containing them together with a large concentration of ferric iron. The process comprises contacting the aqueous acidic solution with a substantially water-immiscible liquid organic extractant comprising a mixture of a dialkyl substituted orthophosphoric acid and a second component containing a phosphonyl group thereby to preferentially extract thorium and other rare earth metal values, substantially free from iron, from the aqueous phase to the organic phase.

It is an object of the present invention to provide a simple and inexpensive process for recovering rare earth elements from sulphurous acid solutions containing them.

SUMMARY OF THE INVENTION

According to the present invention, it has been found that rare earth elements can be successfully separated and recovered from sulphurous acid solutions containing them by solvent extraction. In the solvent extraction stage, the sulphurous acid solution containing the dissolved rare earth elements along with metal impurity values associated therewith is contacted with a substantially water-immiscible liquid organic extractant comprising a solution of one of a family of phosphorus-containing extraction agents. These are typically esters of phosphoric acid, such as di-2-ethylhexyl phosphoric acid (DEHPA), or esters of phosphonic acid such as 2-ethylhexyl phosphonic acid mono-2-ethylhexyl ester (EHEHPA), or esters of phosphinic acid, such as di-2,4,4-trimethylpentyl phosphinic acid, e.g. CYANEX 272 made by American Cyanamid, or esters of thiophosphinic acid, such as CYANEX 301, made by American Cyanamid, or mixtures of any of the above with any one or more of tributyl phosphate (TBP) or trioctylphosphine oxide (TOPO), etc.

The ability to separate rare earth elements from a sulphurous acid solution by solvent extraction was not expected and is highly surprising. Sulphurous acid, although a mineral acid, is a weak acid capable of forming complexes with metal ions. Thus, sulphurous acid and the sulphite ions in solution traditionally are considered to be capable of forming stable complexes. There are many publications relating to the solvent extraction of rare earth metal ions, but there is no suggestion in any of these of the possibility of extracting rare earth metal values from sulphurous acid solutions.

The terms "rare earths" and "rare earth metals" as used herein include scandium and yttrium as well as those elements having atomic numbers from 57 to 71 inclusive.

The extraction is normally carried out with the extractant dissolved in a suitable organic diluent which is a substantially water-immiscible liquid in which both the extractant and the extractant containing metal values are soluble. Examples of suitable diluents are kerosine, aliphatic hydrocarbons, aromatic hydrocarbons, halogenated aliphatic and aromatic hydrocarbons, fuel oils, and the like. In terms of cost and suitability, kerosine is particularly preferred.

In a more specific embodiment of the extracting procedure, the sulphurous acid solution containing dissolved rare earth elements is adjusted to a pH of about 1.5 to 2.0 and this is contacted with an organic solution containing from 0.05 to 0.1 mol/L (hereinafter designed by M) of the phosphorus-containing organic extractant, whereby rare earth elements of atomic number from 65 to 71 and yttrium, along with part of the Gd, Nd and Ca are extracted into the organic phase. The organic and aqueous phases are separated and the pH of the aqueous phase is then adjusted to a range between 2.0 and 2.5 either by heating to volatilize some of the $SO_2$ or sulphurous acid, or by the addition of a small amount of base. This solution is then subjected to a second solvent extraction using a solution containing 0.1 to 0.2M of the above organic extractant, whereby the rare earth elements of atomic number from 63 to 57, and some further Ca and Al are extracted from the aqueous phase. The organic and aqueous phases are then separated.

Another embodiment of the extraction procedure comprises the steps of adjusting the pH of the sulphurous acid to about 1.5 to 2.0 and subjecting this solution to extraction with an organic solution containing from 0.2 to 0.3M of phosphorus-containing extracting agent whereby the rare earth elements of atomic number from 57 to 71, Sc, Y and some Ca and Al are extracted from the aqueous phase into the organic phase.

For both the single and double or multiple stage extraction procedures, the organic and aqueous phases are then separated and the organic solution obtained from the extraction step and containing the rare earths and calcium is optionally washed with dilute acid. The dilute acid is preferably 0.1 to 0.2M sulphurous or other mineral acid and this serves to strip much of the calcium from the organic solvent and transfer it to the aqueous phase without transferring any significant amounts of the useful rare earth elements except lanthanum, and the lightest rare earths, but not including yttrium or scandium.

The optionally washed organic solvent still loaded with the rare earth elements is then treated with a moderately concentrated aqueous solution of mineral acid to transfer the rare earth elements of atomic number from 57 to 71 but typically not the scandium from the organic to the aqueous phase. The preferred acid for this purpose is dilute $HNO_3$, about 1-3M is satisfactory, but 1-6M HCl and 1-6M $H_2SO_4$ can also be used. All other rare earths except scandium are in aqueous acidic solution at this point, and the addition of the neutralizing or precipitating agent to the aqueous solution then causes the precipitation of the mixed rare earths, e.g. as rare earth hydroxides or carbonates etc.

The acid stripped organic solvent may then be treated with a moderately concentrated aqueous solution of alkali, such as to 1 to 2M NaOH, to strip the scandium from the organic extracting agent and transfer it to the aqueous solution and simultaneously precipitate it there in solid form, e.g. as $Sc(OH)_3$. All the organic phase can then be recycled to the extraction step.

The process of this invention can be adapted to either batch or continuous operations. The extraction and acid stripping steps can be carried out using, for example, simple mixing tanks, mixer settlers, direct or counter-current flow columns, centrifugal contactors or other suitable equipment. Counter-current flow liquid-liquid contactors are preferred. In batch acid stripping operations, a second repeated contact with stripping acid is frequently employed to assure substantially complete stripping of yttrium and other rare earth metal values from the organic extract.

A further advantageous feature of the present invention resides in the fact that a large part of the acid values in the solution from which the rare earths have been extracted may be combined and subjected to a recovery process in which the solutions are heated to volatilize the sulphur dioxide thereby raising the solution to pH 2.4-3.0. The dissolved $SiO_2$ values are thereby precipitated. The volatilized $SO_2$ is collected in water to form a solution of sulphurous acid for recycling. The precipitated $SiO_2$ is separated from the solution.

The above solution, essentially freed of $SiO_2$, is then further heated to volatilize still more $SO_2$ or sulphurous acid, to raise the pH from about 3.2 to 4.0, whereupon the dissolved $Al_2O_3$ values are largely precipitated. Again, the volatilized $SO_2$ is collected and converted to sulphurous acid to be recycled to a leaching step. The precipitated $Al_2O_3$ values are separated from the solution. In another alternative method, the $SO_2$ can be recovered in a single operation by heating the solutions until the pH changes sufficiently (the pH increases) to cause the precipitation of both $SiO_2$ and $Al_2O_3$.

The above solution, essentially freed of precipitated $Al_2O_3$, is then further treated to recover the sodium hydroxide values. For example, one way of achieving this is by adding calcium hydroxide whereby a precipitate of calcium sulphite is made and sodium hydroxide is produced in the solution. The calcium sulphite solids are separated from the solution and the remaining solution containing NaOH can be recycled to the Bayer process.

In the specification and claims, all references to the pH refer to measurements made with a glass electrode, properly standardized against buffer solutions. As indicated, the pH was measured of both the slurry containing the suspended solids, and of the clear filtrate obtained by filtering these suspensions. It has been observed that the pH of the slurry is not always the same as the pH of the filtrate, this being caused by the presence of suspended material in the suspension.

The invention will become more readily apparent from the following detailed description taken in conjunction with the accompanying drawings in which.

Figure 1:
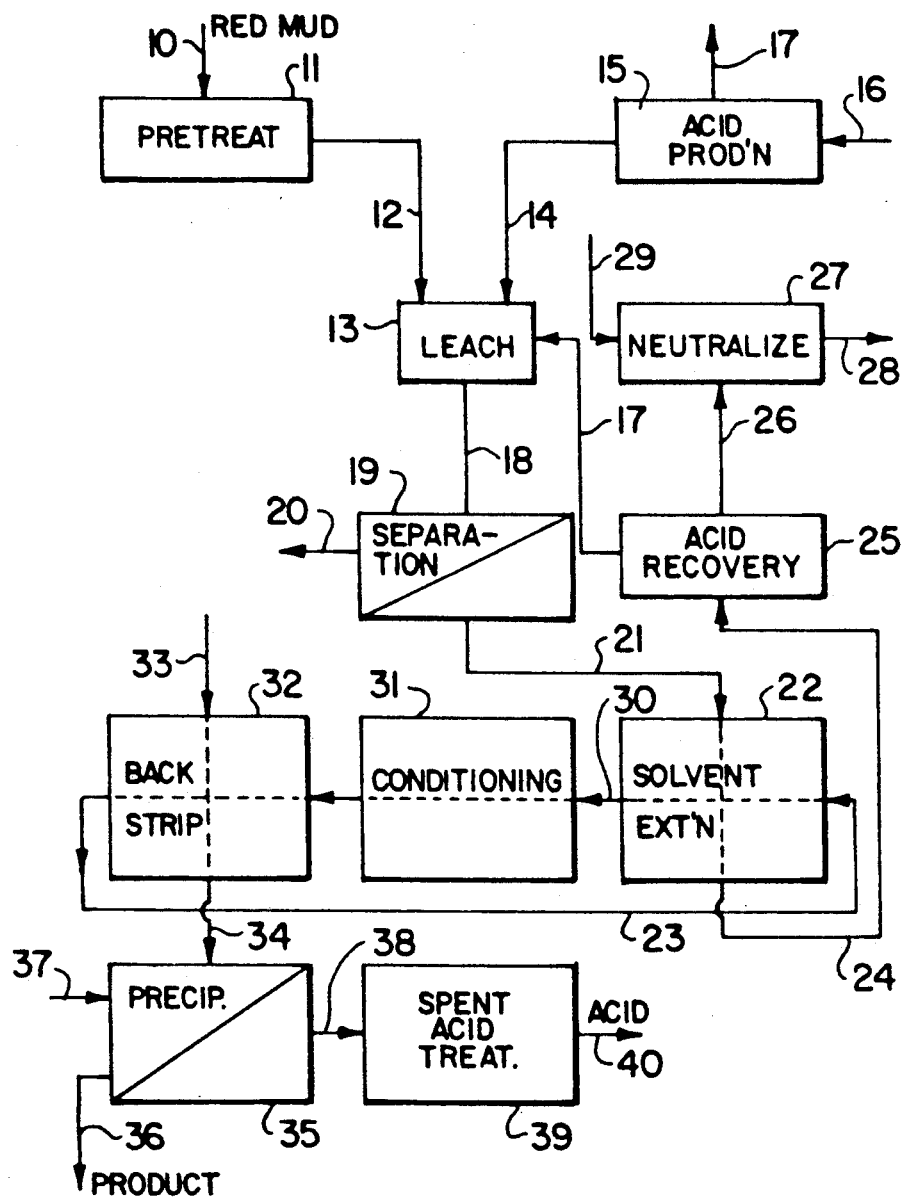
FIG. 1 shows a flow sheet illustrating in block form.

As shown in FIG. 1, red mud slurry 10 is received from a Bayer plant and may optionally be subjected to a pretreatment stage 11 to remove residual soda-containing liquor. The pretreated red mud is transferred via line 12 to a leaching stage 13 where it is contacted with a solution of sulphur dioxide and water. This is formed in stage 15 with the raw materials ($SO_2$ and water) being introduced via lines 16 and the sulphur dioxide dissolved in water being transferred to the leaching stage 13 via line 14. Recycled gaseous $SO_2$ may also be added via line 17 or after being dissolved in an aqueous stream.

The leach slurry from the leaching stage 13 is transferred via discharge line 18 to a separating stage 19. This may conveniently be in the form of filtration or sedimentation with the leached solid residue being collected via discharge 20 for washing to recover soluble values prior to disposal and the filtrate or leachate liquor being withdrawn through line 21 and transferred to a solvent extraction stage or stages 22. Optionally, leaching may be carried out in several steps at decreasing pH values with intermediate solid-liquid separations.

The solvent extraction stage 22 may conveniently be a conventional mixer-settler apparatus or a series of such apparati in which the leachate liquor 21 comes into contact with an organic phase 23 containing an organophosphorus compound as extractant. After contacting the organic phase and leachate liquor for a period of time depending upon such factors as the volume ratio of organic to aqueous, the resulting rare earth-containing organic phase and the extracted aqueous phase (raffinate) are allowed to physically disengage after which they are separated from each other by conventional liquid-liquid separation techniques such as drawing the aqueous phase from the bottom of the settler. Thus, the loaded organic phase is drawn off through line 30 and the aqueous (raffinate) phase is drawn off through bottom discharge line 24.

The raffinate 24 from the rare earth extraction is recycled through acid recovery stage 25 with recovered acid 17 being recycled back to the leaching stage 13. Typically silica and alumina compounds are precipitated in turn during the acid recovery operation, and may be recovered together or separately if desired. The remainder of the raffinate 26 proceeds to a raffinate neutralization stage 27 where it is contacted by a neutralizing agent 29 with the neutralized raffinate being recovered through discharge 28. Optionally, caustic soda may be recovered for recycle to the Bayer plant at this point.

The loaded organic 30 from the rare earth extraction stage is optionally passed through a conditioning unit 31 and then into a stripping unit 32 where it is stripped by means of a mineral acid solution 33. The organic phase passing through the stripping operation becomes the recycled organic phase 23 to the solvent extraction stage 22, while the aqueous discharge 34 from the stripping operation 32 discharges to a precipitation and product recovery unit 35. Here, a precipitant 37 is added and the precipitated rare earth compounds are recovered via discharge 36, while the liquid phase is discharged through line 38 to a spent acid treatment 39, with the spent acid being disposed of at 40. The solvent extraction and backstripping stages may optionally be carried out in multiple steps at increasing pH of the aqueous phase and/or increasing concentration of the organo-phosphorus extractant in the organic phase to obtain separate fractions of the total rare earths present.

The process is further described by reference to the following examples.

EXAMPLE 1

Solvent extractions were conducted on acid solutions obtained from leaching of red mud with sulphurous acid and having the typical analysis given below. Other rare earth elements except Pm were also present in the solution.

| Element | Conc. in ppm (wt) |
| --- | --- |
| Y | 33.7 |
| La | 30.6 |
| Ce | 27.1 |
| Pr | 6.8 |
| Nd | 20.5 |
| Eu | 0.9 |
| Gd | 4.5 |
| Dy | 3.3 |
| Ho | 0.9 |
| Er | 2.1 |
| Fe | 53 |
| Al | 341 |

-continued

| Element | Conc. in ppm (wt) |
| --- | --- |
| Na | 324 |
| Si | 48 |
| Ca | 1222 |

The aqueous sulphurous acid leach solutions at initial pH values of 1.47, 2.05, 2.49, were then contacted with an organic phase at an aqueous:organic volume ratio of 1:1, where the organic phase consisted of a solution of EHEHPA (2-ethylhexyl phosphonic acid mono-2-ethylhexyl ester) in kerosine by manual shaking in a separatory funnel at room temperature for times of 2 minutes to 30 minutes. The concentration of the extractant in the kerosine varied from 0.05M to 0.2M.

At the end of the contacting period, the organic and aqueous phases were allowed to separate by standing, and the aqueous phase was drained off and re-analyzed. The extraction of each element was obtained by difference from the original aqueous solution analysis, and the degree of extraction of rare earth element was expressed as a percentage of the original quantity present.

Table 1 presents a part of the results for the case of 0.1M EHEHPA in kerosine as the extractant.

Finally, the organic phase was contacted for 5 minutes each with six portions of 3M $HNO_3$ solution by shaking in a separatory funnel at room temperature in the presence of a few drops of 2-ethyl-1-hexanol using a total aqueous: organic phase ratio of 6:5. All of the aqueous portions were combined, and the combined aqueous phase was analyzed for rare earths and the major impurities, and these analyses were corrected back to the original aqueous phase volume basis. From this, stripping efficiencies were calculated for the rare-earths, which were found to be essentially 100% for all the rare earths under these conditions.

Table 1 shows the impurity concentrations (ppm.wt. on original volume basis) found typically in the strip solutions for the case of 0.1M EHEHPA in kerosine as the extractant and 3M $HNO_3$ as the strippant.

Figure 2:
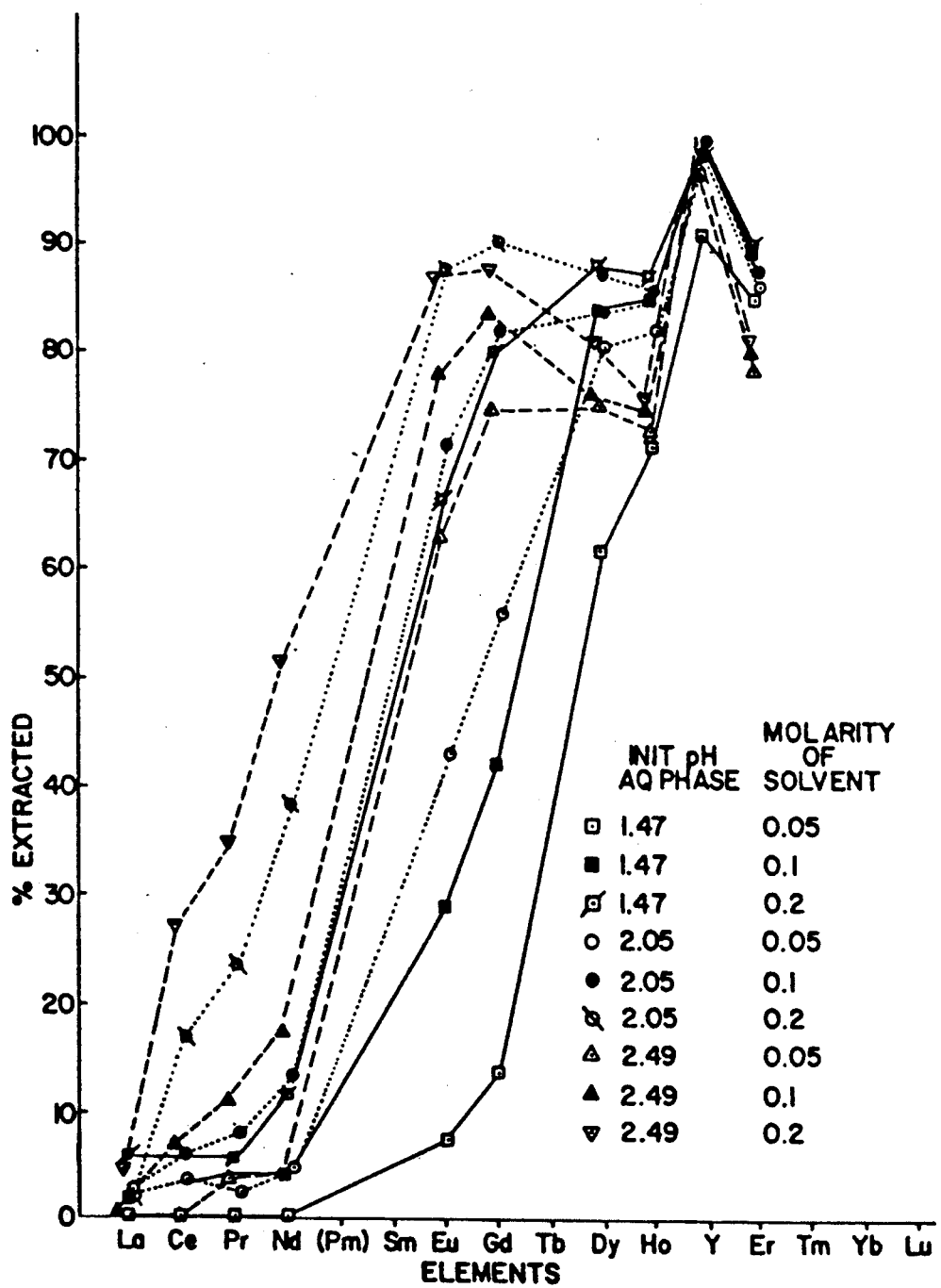
FIG. 2 is a graph showing extractions during solvent extraction.

Finally, FIG. 2 shows a summary of all the results obtained in this way at an extraction time of 10 minutes for three EHEHPA concentrations in kerosine as the extractants and three starting pH values in the initial aqueous solutions.

The results in FIG. 2 show clearly that surprisingly an excellent split at the solvent extraction stage can be obtained in which yttrium and the heavier rare earths can be selectively solvent extracted into the organic phase (and subsequently transferred into an aqueous phase) to permit recovery of a "heavy+Y" rare earth concentrate and recycle of the stripped organic phase) by operating at a relatively low initial value of the aqueous phase pH and/or a very dilute extractant concentration such as 0.05M in the organic phase. A subsequent second extraction on the same solution with a more concentrated such as 0.2M extractant in the organic phase and/or at a higher initial pH of the aqueous phase permits recovery of a middle rare earth concentrate, etc. The point of the splits between fractions is easily adjusted by adjusting the two parameters noted.

TABLE 1

| Initial Aqueous Phase pH | Extraction Time min. | % Extraction | | | | | | | | | ppm Impurities in Strip | | | | | |
|---|---|---|---|---|---|---|---|---|---|---|---|---|---|---|---|---|
| | | La | Ce | Pr | Nd | Eu | Gd | Dy | Ho | Y | Er | Fe | Al | Na | Si | Ca |
| 1.47 | 2 | 0.2 | 0.3 | 0 | 0.3 | 32.2 | 47.9 | 73.5 | 74.1 | 98.3 | 78.8 | 1.3 | 21.0 | 0.46 | 0.78 | 4.31 |
| 1.47 | 5 | 1.1 | 0.8 | 0 | 0 | 28.9 | 42.8 | 84.9 | 84.0 | 98.2 | 89.0 | 1.3 | 31.6 | 0.55 | 0.25 | 4.61 |
| 1.47 | 10 | 1.7 | 3.0 | 4.1 | 3.8 | 28.9 | 41.8 | 83.6 | 84.0 | 98.0 | 88.8 | 2.4 | 41.7 | 0.40 | 0.25 | 4.00 |
| 1.47 | 30 | 4.2 | 7.3 | 8.6 | 0 | 27.6 | 42.6 | 74.7 | 78.5 | 98.0 | 82.8 | 3.7 | 46.9 | 1.09 | 1.00 | 3.97 |
| 2.05 | 2 | 3.2 | 10.8 | 15.5 | 24.7 | 82.2 | 87.0 | 82.7 | 83.7 | 99.7 | 87.0 | 1.3 | 65 | 0.61 | 0.30 | 4.80 |
| 1.95 | 5 | | | | | | | | | | | 1.3 | 98 | 0.47 | 0.33 | 3.99 |
| 2.05 | 10 | 3.5 | 5.9 | 7.5 | 13.3 | 71.4 | 81.9 | 83.6 | 84.2 | 99.6 | 87.2 | 1.3 | 129 | 0.55 | 0.49 | 5.04 |
| 1.92 | 15 | | | | | | | | | | | 1.3 | 104 | 0.26 | 0.25 | 3.73 |
| 2.00 | 30 | 0 | 0 | 0 | 5.2 | 61.8 | 76.2 | 75.9 | 79.4 | 99.5 | 80.4 | 3.0 | 118 | 0.95 | 1.02 | 3.86 |
| 2.49 | 2 | 3.7 | 16.1 | 25.5 | 35.3 | 85.6 | 87.7 | 82.6 | 79.8 | 99.6 | 84.1 | 6.0 | 101 | 1.63 | 2.23 | 5.30 |
| 2.49 | 5 | 0 | 2.8 | 12.1 | 7.5 | 74.3 | 83.3 | 81.5 | 78.1 | 99.5 | 82.0 | 7.0 | 125 | 1.30 | 1.32 | 5.03 |
| 2.49 | 10 | 0.2 | 6.9 | 10.6 | 17.2 | 77.6 | 83.2 | 76.8 | 74.3 | 99.5 | 79.4 | 6.3 | 176 | 1.05 | 0.84 | 4.08 |
| 2.49 | 30 | 0 | 0 | 4.9 | 5.7 | 67.0 | 81.3 | 79.9 | 78.5 | 99.3 | 81.9 | 8.9 | 142 | 1.89 | 1.39 | 4.13 |

EXAMPLE 2

TABLE 2

DILUTE ACID WASH OF ORGANIC PHASE AT ROOM TEMPERATURE

| Acid | Applicn. | Solution | La | Ce | Pr | Nd | Eu | Gd | Dy | Ho | Y | Er | Fe | Al | Ca |
|---|---|---|---|---|---|---|---|---|---|---|---|---|---|---|---|
| 0.12M.H$_2$SO$_3$ | 6 × 10 ml, | Init. Org. Phase, ppm* | 16.9 | 20.2 | 4.25 | 19.4 | 0.79 | 4.21 | 3.53 | 0.67 | 39.6 | 1.97 | 5.5 | 272 | 151 |
| | | % Removed by Wash | 50.3 | 44.3 | 48.6 | 32.2 | 7.5 | 4.3 | 2.3 | 9.6 | 0.07 | 5.8 | 50.2 | 2.5 | 35 |
| 0.05M.HCl | 1 × 10 ml, | Init. Org. Phase, ppm** | 12.6 | 20.0 | 4.89 | 20.9 | 1.14 | 5.69 | 3.94 | 1.02 | 48.5 | 2.55 | 4.8 | 314 | 179 |
| | | % Removed by Wash | 19.1 | 4.7 | 0 | 2.6 | 0.3 | 4.4 | 0 | 5.6 | 0.10 | 0 | 50 | 0.8 | 28.9 |
| 0.05M.HNL$_3$ | 1 × 10 ml, | % Removed by Wash | 10.7 | 2.2 | 0 | 1.0 | 0.3 | 4.4 | 0 | 5.6 | 0.10 | 0 | 50 | 0.8 | 27.6 |
| 0.05M.H$_2$SO$_4$ | 1 × 10 ml, | % Removed by Wash | 54.0 | 30.4 | 13.5 | 17.5 | 1.1 | 4.4 | 0 | 5.6 | 0.10 | 0 | 50 | 0.9 | 30.8 |

*Based on results of complete backstrip in 3M.HNO$_3$ using multiple applications and analysis of aqueous strip solution.
**Based on difference in init. leach soln. on solvent extraction.

Sulphurous acid solutions were solvent-extracted at room temperature using an organic phase consisting of 0.2M DEHPA in kerosine with a volume ratio of the aqueous: organic phases of 1:1, leading to organic phases with the concentrations of typical rare earth elements and impurities shown in Table 2, in the rows labelled "Initial Organic Phase".

50 mL portions of these organic phases were contacted by shaking for 5 minutes at room temperature with one or more successive portions of 10 mL each of very dilute aqueous acid solutions (0.12M H$_2$SO$_3$, 0.05M HCl, 0.05M HNO$_3$, 0.05M H$_2$SO$_4$) in the presence of a few drops of an alcohol. The aqueous and organic phases were then allowed to separate, and finally the quantity of each metal extracted into the combined aqueous wash phase was determined in each case by analysis of the aqueous phases, and is reported in Table 2 as a percentage of the quantity initially present in the organic phase subjected to washing.

As seen from Table 2, the percentages of the middle and heavy rare earths and yttrium removed by the washing operation are negligibly small, while significant portions of the iron and especially calcium impurities are removed, together with intermediate quantities of the lightest rare earth elements, starting at atomic number 57.

By carrying out such a wash of the organic phase with very dilute mineral acid solutions, it is therefore possible to obtain a purer heavy and middle rare earth concentrates after the subsequent stripping of the washed organic phase with more concentrated acid solutions, such as, for instance, 3M HNO$_3$. However, this is done at the cost of losing in the wash solution some portion of the light rare earth metals which are typically of low commercial value.

EXAMPLE 3

Starting with aqueous sulphurous acid solutions having pH values of approximately 2.0, a typical composition of which is shown at the foot of Table 3, solvent extractions were carried out at room temperature using organic phases consisting of solutions of single and mixed organo-phosphorus extractants at various concentrations in a number of organic diluents by contacting the aqueous and organic phases for 15 minutes at an aqueous:organic volume ratio of 1:1. The aqueous phases were analyzed before and after the extraction operations for typical rare-earth elements and impurities, from which the percentage extraction of the analyzed elements were calculated. The impurities subsequently stripped from the organic phases using 3M HNO$_3$ are also reported on an original volume basis. Typical results are shown in Table 3.

From Table 3 it can be seen that of the solvents examined DEHPA gives the greatest extraction effect, especially for the lighter rare earth elements, followed by EHEHPA and then by Cyanex 272. Cyanex 301 (thiophosphinic acid type of extractant), for which results are not shown in Table 3, extracted approximately 10% of the yttrium from the aqueous phase at a concentration of 1M in kerosine, but extracted essentially none of the other rare earth elements. More concentrated solutions of DEHPA and EHEHPA up to 1M (results not shown in Table 3) gave good extractions of the light as well as of the heavy rare earths, but with the penalty of an increased transfer of iron and calcium impurities into the final wash solution.

It can be seen that the use of the relatively weak extractant Cyanex 272 would be of considerable interest if it were desired to selectively extract only the yttrium and valuable heavy rare earths from an aqueous sulphurous acid leach solution.

It can also been seen that increasing the concentration to 0.2 and 0.4M of a phosphorus-containing organic co-extractant such as TOPO (which is not believed to operate by an ion-exchange mechanism as in the case of DEHPA, EHEHPA and Cyanex 272) causes the degree of extraction of the light and middle rare earth metals to fall off while not significantly changing that of the yttrium and heavy rare earths. This therefore also provides a means for increasing the selectivity of the extraction of the latter when this is desirable.

of each element originally in the organic phase which was stripped into the aqueous nitric acid stripping medium was calculated.

Table 4 shows typical results of such tests in which the diluent of the organic phase consisted of hexane. In this Table, lanthanum (La) and cerium (Ce) can be taken as representing the behaviour of the light rare earth elements, gadolinium (Gd) that of the middle rare earth elements, and holmium (Ho) and erbium (Er) that of the heavy rare earth elements. Results are presented separately for yttrium. The results for calcium (Ca) can be taken as typical of the behaviour of the most troublesome impurity elements.

Table 4 shows that the stripping of the light and middle rare earth elements by 3M $HNO_3$ occurs efficiently and without problems. However, when DEHPA is used as the extractant in particular, it be-

TABLE 3

EFFECTS OF EXTRACTANT

| Extractant | Concn. | Diluent | % Extraction ||||||||| ppm Impurities in Strip ||||||
|---|---|---|---|---|---|---|---|---|---|---|---|---|---|---|---|---|---|
| | | | La | Ce | Pr | Nd | Eu | Gd | Dy | Ho | Y | Er | Fe | Al | Na | Si | Ca |
| DEHPA | 0.1M | Hexane | 14.1 | 34.9 | 36.9 | 54.3 | 89.8 | 91.9 | 83.7 | 87.6 | 99.9 | 89.6 | 1.3 | 112 | 0.59 | 0.49 | 19.3 |
| EHEHPA | 0.1M | Hexane | 4.2 | 19.6 | 28.0 | 42.1 | 86.8 | 89.8 | 85.7 | 83.9 | 99.9 | 86.3 | 1.3 | 219 | 1.0 | 0.48 | 4.0 |
| CYNAEX 272 | 0.1M | Hexane | 1.3 | 2.1 | 3.0 | 2.1 | 27.5 | 34.1 | 77.7 | 72.3 | 95.8 | 80.5 | 1.3 | 31 | 0.43 | 1.7 | 3.0 |
| EHEHPA | 0.2M | Kerosine | 3.1 | 11.9 | 17.2 | 25.2 | 84.1 | 88.4 | 88.1 | 88.6 | 99.8 | 90.2 | 1.3 | 131 | 0.3 | 1.12 | 4.4 |
| EHEHPA + TOPO | 0.2M + 0.2M | Kerosine | 2.9 | 5.2 | 3.7 | 11.7 | 65.5 | 78.0 | 86.7 | 85.9 | 99.5 | 88.0 | 1.3 | 76 | 0.53 | 1.44 | 4.1 |
| EHEHPA + TOPO | 0.2M + 0.4M | Kerosine | 1.7 | 5.2 | 0.7 | 3.6 | 46.7 | 58.9 | 85.1 | 83.9 | 98.9 | 86.5 | 1.3 | 79 | 0.3 | 3.1 | 3.3 |
| Typical Aqueous Phase, ppm | | | 28.1 | 24.4 | 6.8 | 21.7 | 0.99 | 5.5 | 4.0 | 1.0 | 41.8 | 2.5 | 24.8 | 581 | 1202 | 417 | 850 |

EXAMPLE 4

Various organic phases were used for the extraction of rare earth elements from sulphurous acid solutions. The loaded organic phases thus produced were then subjected to stripping using aqueous 3M $HNO_3$ solutions as the stripping medium, which in these cases was applied in six portions of 10 mL each per 50 mL of organic phase, with each portion being contacted with the organic phase for 5 minutes at room temperature in the presence of a few drops of 2-ethyl-1-hexanol.

The concentrations of several of the rare earth elements and typical impurities in the organic phase were calculated by difference from the analyses of the original aqueous sulphurous acid solutions before and after extraction with the organic phase, and the concentrations in the combined aqueous strip portions were also determined by analysis and converted to the original volume basis to permit direct comparison with the organic phase concentrations, after which the percentage comes increasingly difficult to efficiently strip the yttrium and valuable heavy rare earth elements as the DEHPA concentration in the organic phase is increased. Conversely, the stripping of the undesired Ca impurity increases.

Table 4 also shows that at a given extractant concentration, 1M for example, the degree of stripping of yttrium and the heavy rare earth elements from the organic phase can be considerably improved by using EHEHPA as the extractant instead of DEHPA. This also leads to a decrease in the quantity of Ca impurity stripped into the final aqueous solution, which can be still further decreased by the use of Cyanex 272 as the extractant, so as to improve the purity of the rare earth concentrate produced finally from the backstrip solution if this is desired.

TABLE 4

STRIPPING OF RARE EARTHS FROM ORGANIC PHASE
Strip Medium: 3M.$HNO_3$ Solution, applied in 6 portions of
10 mL/50 mL Org. Phase
5 Min. Contact/Portion, Room Temp., in presence of several drops of 2-ethyl-1-hexanol.

| Organic Phase | % Element Stripped from Org. Phase ||||||| |
|---|---|---|---|---|---|---|---|
| | La | Ce | Gd | Ho | Y | Er | Ca |
| 0.02M.DEHPA in Hexane | * | * | 95.1 | 98.5 | 99.9 | 100 | 20.3 |
| 0.1M.DEHPA in Hexane | * | 98.9 | 96.2 | 97.4 | 96.7 | 100 | 23.6 |
| 0.2M.DEHPA in Hexane | 100 | 100 | 95.4 | 97.9 | 97.0 | 100 | 33.5 |
| 0.5M.DEHPA in Hexane | 100 | 98.1 | 96.7 | 91.1 | 76.1 | 73.0 | 100 |
| 1.0M.DEHPA in Hexane | 98.3 | 100 | 96.7 | 60.0 | 38.1 | 31.8 | 100 |
| 1.0M.EHEHPA in Hexane | 96 | 100 | 90.7 | 90.0 | 91.7 | 92.6 | 19.0 |
| 1.0M.CYANEX 272 in Hexane | * | * | 86.8 | 91.0 | 91.8 | 90.6 | 0.6 |

*Low extraction into organic phase leads to poor accuracy in analysing strip solutions.

We claim:

1. A process for recovering rare earth elements comprising the steps of: (1) providing an aqueous sulphurous acid solution containing rare earth values, including elements having atomic numbers from 57 to 71 inclusive, scandium and yttrium, (2) contacting said sulphurous acid solution containing rare earth values with a substantially water-immiscible liquid organic extraction agent comprising an organo-phosphorus compound thereby to extract said rare earth elements into the organic phase, (3) separating the resulting rare earth elements containing organic extract from the residual acidic aqueous phase and (4) stripping the rare earth element from the organic extract.

2. A process according to claim 1 wherein the extractant is 2-ethylhexylphosphonic acid mono-2-ethylhexyl ester.

3. A process according to claim 1 wherein the extraction agent is di-2-ethylhexyl phosphoric acid.

4. A process according to claim 1 wherein the extractant is a mixture of (a) at least one extractant selected from di-2-ethylhexyl phosphoric acid, di-2,4,4-trimethylpentyl phosphinic acid, 2-ethylhexylphosphonic acid mono-2-ethylhexyl ester, esters of thiophosphinic acid and (b) tributyl phosphate.

5. A process according to claim 1 wherein the extractant is a mixture of (a) at least one extractant selected from di-2-ethylhexyl phosphoric acid, di-2,4,4-trimethylpentyl phosphinic acid, 2-ethylhexylphosphinic acid mono-2-ethylhexyl ester, esters of thiophosphinic acid and (b) trioctyl phosphine oxide.

6. A process according to claim 1 wherein the extraction with organic extraction agent is sequentially repeated with each sequential repeat being at a sequentially higher pH.

7. A process according to claim 1 wherein the extraction with organic extraction agent is sequentially repeated with each sequential repeat being at a sequentially higher concentration of said organic extraction agent.

8. A process according to claim 7 wherein each sequential repeat is also carried out at a higher pH.

9. A process according to claim 6 wherein the extraction with organic extraction agent is carrier out twice sequentially, the first sequential extraction being at a pH of 1.5 to 2.0 whereby rare earth elements of atomic number from 65 to 71 inclusive and yttrium are extracted into the organic phase and the second sequential extraction being at a pH of 2.0 to 2.5 whereby rare earth elements of atomic numbers from 63 to 57 are separately extracted into a second organic phase.

10. A process according to claim 2 wherein the extraction with organic extraction agent is carried out twice sequentially, the first sequential extraction being with an extractant concentration of 0.05M whereby rare earth elements of atomic number from 65 to 71 inclusive and yttrium are extracted into the organic phase, and the second sequential extraction being with an extractant concentration of 0.2M whereby rare earth elements of atomic numbers from 63 to 57 are extracted into the organic phase.

11. A process according to claim 3 wherein the extraction with organic extraction agent is carried out twice sequentially, the first sequential extraction being with an extractant concentration of 0.05M whereby rare earth elements of atomic number from 65 to 71 inclusive and yttrium are extracted into the organic phase, and the second sequential extraction being with an extractant concentration of 0.2M whereby rare earth elements of atomic numbers from 63 to 57 are extracted into the organic phase.

12. A process according to claim 1 wherein the extraction agent is dissolved in an aliphatic or aromatic diluent.

13. A process according to claim 1 wherein the extraction agent is dissolved in kerosine.

14. A process according to claim 1 wherein the loaded organic solvent obtained from the extraction step is washed with very dilute acid to selectively strip co-extracted calcium therefrom, without significant loss of medium to heavy rare earth elements or yttrium or scandium.

15. A process according to claim 14 wherein the washed organic solvent is further washed with a moderately concentrated aqueous solution of mineral acid to strip rare earth elements therefrom.

16. A process according to claim 1 wherein acid containing streams from the extractions are collected and heated to drive off sulphur dioxide.

17. A process according to claim 1 wherein acid containing streams from the solvent extractions are collected and heated to drive off sulphur dioxide and cause precipitation of $SiO_2$ values.

18. A process according to claim 17 wherein the sulphur dioxide is recovered for re-use.

19. A process according to claim 1 wherein the sulphurous acid leach solution is obtained by digesting Bayer process red mud in a dilute digestion acid comprising sulphur dioxide dissolved in water.

20. A process according to claim 1 wherein the sulphurous acid solution is obtained by sparging sulphur dioxide into an aqueous solution of Red Mud.

21. A process according to claim 1 wherein the leach solution contains less than 120 ppm of iron.

22. A process according to claim 19 wherein the acid containing streams from the extractions are collected and heated to drive off sulphur dioxide, and cause precipitation of the $SiO_2$.

23. A process according to claim 22 wherein the sulphur dioxide is recovered for reuse.

24. A process according to claim 23 wherein the acid containing stream is further heated to drive off more sulphur dioxide to cause the precipitation of $Al_2O_3$.

25. A process according to claim 24 wherein the sulphur dioxide is recovered for reuse.

* * * * *